March 31, 1953 E. DASKAM, JR 2,633,535
MULTIVIBRATOR CIRCUITS
Filed Oct. 6, 1950
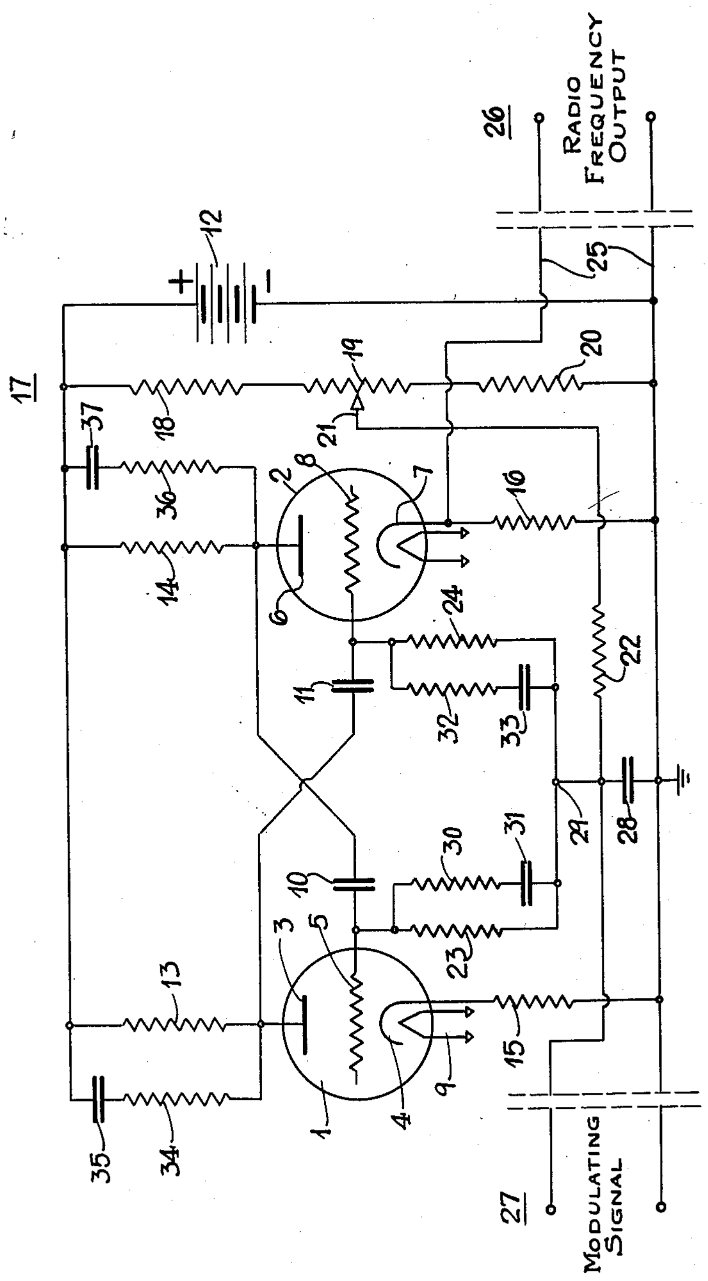
INVENTOR.
EDWARD DASKAM JR.
BY Ward, Crosby & Neal
ATTORNEYS.

Patented Mar. 31, 1953 2,633,535

UNITED STATES PATENT OFFICE 2,633,535

MULTIVIBRATOR CIRCUITS

Edward Daskam, Jr., Franklin Square, N. Y., assignor, by mesne assignments, to Automatic Electric Laboratories, Inc., Chicago, Ill., a corporation of Delaware Application October 6, 1950, Serial No. 188,689

5 Claims. (Cl. 250—36)

This invention pertains to improvements in square-wave electronic oscillation generators, commonly termed "multivibrators" or relaxation oscillators.

In U. S. Patent 2,338,395 to E. H. B. Bartelink, and in a publication by the same person entitled "A Wide-Band Square-Wave Generator" appearing in the 1941 AIEE Transactions, there is described a multivibrator employing a positive biasing voltage on the grids of the multivibrator tubes. As shown in these publications, the generated frequency of such a multivibrator increases in substantially linear relation to increase in the grid-biasing voltage over a relatively wide range; and also varies in inverse relation to the product $rc$, where $c$ is the capacity of each of the grid-to-plate coupling condensers, and $r$ is the total discharge resistance through which each of these condensers discharges. That is to say, $r=R_p+R_g$ where $R_p$ is the external plate or load resistance for each tube, and $R_g$ the grid-leak resistance.

It will be seen from the above that any given frequency of oscillation may be obtained, within limits, by appropriately adjusting the magnitude of the positive grid-biasing voltage, or the magnitude of $c$, $R_p$ or $R_g$, or any combination of these. It is to be noted, however, other factors remaining constant, that increasing the positive grid-biasing voltage to too high a value to secure an increased oscillation frequency has the disadvantage of increasing the flow of grid current and also that of the plate current in the multivibrator tubes, thus tending to shorten the tube life by increased cathode emission of and increased heating of the tube elements, quite aside from the increase in power dissipation in the tube circuits. Similar effects result from increasing the frequency by decreasing $r$, i. e., $R_p$ or $R_g$ or both. These objections are not present where frequency adjustment is obtained by variation in the capacities $c$ of the grid-to-plate coupling condensers, but there are definite upper limits to which the frequency may be feasibly adjusted in this manner, owing to the fact that the magnitudes of the coupling capacitors involved become comparable with, if not smaller, than tube interelectrode and wiring capacitances. This results in poor multivibrator frequency stability and in the extreme case, causes it to stop oscillating. In general, therefore, frequency adjustment over a wide range necessitates adjustment of the positive grid-biasing voltage, and in some instances, also of $r$, i. e., $R_p$ or $R_g$ or both, with accompanying disadvantages, as above noted.

Now I propose, in accordance with the present invention, to eliminate the above-mentioned disadvantages resulting from increasing the frequency of the multivibrator by increasing the positive grid-biasing voltage or decreasing the value $r$ or both, by resort to the following circuit modifications. Across each of the grid-leak resistors $R_g$, and optionally also across each of the plate resistors $R_p$, I connect shunt circuits consisting, in each instance, of a resistance in series with a condenser. The resulting networks thus provide paths for the flow of direct current through $R_g$ and/or $R_p$ and the resistance values of said $R_g$ and/or $R_p$ may, therefore, be selected independently of the effective alternating current impedances of these networks, and may thus be so chosen as to restrict the magnitudes of the grid and plate currents to safe operating values, irrespective of the frequency of operation. On the other hand, the series resistance can be chosen so that in conjunction with the coupling capacitor, the desired frequency of operation may be obtained. The capacitance in the shunt circuit should be large enough to have negligible impedance at the frequency of oscillation since it serves only as a D. C. blocking condenser.

Thus, for example, if it is desired to increase the frequency of operation, the shunt resistors in the grid circuits can be decreased, while the grid-leak resistors $R_g$ and likewise, if desired, the external plate circuit resistors $R_p$ may be kept quite high in value so as to maintain grid and plate currents of small magnitude, respectively. In this way, an increase in frequency of operation may be obtained without any accompanying substantial change in magnitudes of plate and grid currents.

The single figure of the accompanying drawing shows a multivibrator circuit of the positive grid bias type embodying the invention.

Referring to the drawing, the circuit comprises a pair of electronic tubes 1, 2, each provided with anode, cathode and control grid electrodes, respectively as at 3, 4, 5 and 6, 7, 8. The cathodes are preferably indirectly heated, as at 9. The grid-to-plate coupling condensers interconnecting the grids and anodes of the respective tubes are shown at 10, 11. The space paths of the tubes are energized from a source of direct current plate voltage 12, the positive terminal of which is connected to the tube anodes through external plate or load resistors 13, 14, respectively, and the negative terminal of which is connected to the tube cathodes through cathode resistors 15, 16, respectively. For purposes of applying a positive biasing potential to the control grids 5, 8 of the tubes, there is provided a potentiometer, shown generally at 17 and consisting of three fixed resistors 18, 19, 20 bridged in series across battery 12 to provide the fixed arm of the potentiometer, to the intermediate resistor 19 of which a variable tap 21 extends through a common coupling resistor 22, and thence in parallel through grid-leak resistors 23, 24 to the grids 5, 8, respectively, of tubes 1 and 2.

The circuit as thus far described corresponds to that of said Bartelink patent and publication, and may be employed, in this form, as a square-wave generator, in which case, the output may be tapped off across one of the cathode resistors, such as 16, as by means of connections 25, extending to output terminals 26. Alternatively, the circuit may be employed as a frequency modulator for modulating signaling frequencies, or as a frequency converter, for either of which purposes a modulating signal or frequency may be applied to input terminals, as at 27, and impressed upon the multivibrator circuit through a coupling impedance, such as condenser 28, connected between the grounded or negative terminal of battery 12 and point 29 of the circuit at which the grid-leak resistors 23, 24 are connected to the common coupling resistor 22.

The operation of the circuit, as thus far delineated, requires no detailed description herein, inasmuch as it is fully set forth in the Bartelink patent and publication referred to. Suffice it to say, as above noted, that the oscillation frequency will vary within relatively wide limits in substantially linear relation to the positive biasing potential impressed on the control grids 5, 8 from the potentiometer 17, over connections 21, 22, 29 and thence through the grid-leak resistors 23, 24, respectively, to the respective grids 5, 8. Likewise, the oscillation frequency will vary inversely with the product of the capacities $c$ of the grid-to-anode coupling condensers 10 and 11, and the total resistances $r$ through which these condensers respectively charge and discharge. In the case of condenser 10, for example, this total resistance $r$ will comprise in series, the plate resistor 14 in parallel with the internal tube resistance, grid-leak resistor 23, coupling resistor 22 and the lower tapped portion of potentiometer resistor 19, as well as 20, both in parallel with the upper tapped portion of 19 and resistor 18. Similarly, for coupling condenser 11, resistance $r$ will comprise the series resistors 13 in parallel with the internal tube resistance, 24, 22, 19 (lower tapped portion) and 20, the latter two being paralleled by the upper tapped portion of 19 and resistor 18. At the lower frequencies, grid resistors 23 and 24 are large enough so that the remaining resistors can be neglected, but this is not true at the higher frequencies where $r$ must be made small.

Since the control grids of the multivibrator tubes are positively biased with respect to the cathodes, as above explained, the tubes will, in operation, draw grid currents and also relatively high plate currents, which will become excessively high at the higher frequencies of operation owing to the fact that $r$ must be decreased to obtain such frequencies and so the grid resistors, 23 and 24, and plate resistors, 13 and 14, must be made small. As above stated, this greatly shortens the lives of the tubes, due to excessive cathode emission and overheating of electrodes. Furthermore, the long time frequency stability of the multivibrator at these higher frequencies is poor because the high currents heat the resistive components, causing their values to change. In addition, the rapid tube aging causes the frequency of oscillation to change so that over a long period of time, the frequency "drifts" badly.

In accordance with the present invention, and as above mentioned, I propose to overcome this difficulty by shunting each of the grid leak resistors 23, 24, with a connection comprising a resistance in series with a condenser, as at 30, 31 and 32, 33, respectively. I may also, if desired or found necessary for any particular frequency of operation, similarly shunt the external plate or load resistors 13, 14 with such connections comprising resistors in series with condensers, as at 34, 35 and 36, 37. This is not as critical as the grid resistors because the low internal resistance of the tube (for triodes) shunts the plate load resistors. Hence, only at the higher frequencies (of the order of one megacycle) should this become necessary. With the multivibrator circuit as thus modified, the magnitudes of the grid-leak resistors 23, 24 may be so chosen, irrespective of the frequency of operation, as to maintain the flow of grid current in the space paths of the tubes at acceptably low values, relying on the shunt paths 30, 31 and 32, 33 to adjust the time constants of the coupling condensers 10, 11, charging and discharging circuits to appropriate values in accordance with the frequency of operation desired, this on the assumption that no shunt paths, such as 34, 35 and 36, 37 are connected across the plate or load resistors 13, 14. If, however, such shunt paths are provided about the plate resistors, the magnitudes of the plate resistors 13 and 14 may be so chosen as to adjust the flow of plate current in tubes 1 and 2 to appropriately low values, relying on the shunt paths 34, 35 and 36, 37, in conjunction with the shunt paths 30, 31 and 32, 33, connected across the grid-leak resistors 23, 24, to adjust the time constants of the coupling condensers 10, 11, charging and discharging circuits to appropriate effective or resulting values, in conformity with the desired frequency of operation.

I claim:

1. In a multivibrator of the positive grid bias type: a pair of electronic tubes, each of said tubes having anode, cathode and control grid electrodes; a pair of anode resistors; each of said anode resistors connected in series with one of said anodes; a coupling condenser connected between the grid of each tube and the anode of the opposite tube; leak resistances connected from the grids of the respective tubes to a source of positive biasing potential; another pair of resistors other than said anode resistors; another pair of condensers other than said coupling condensers; each one of said last mentioned resistors connected in series with one of said last mentioned condensers and in shunt to each said leak resistance.

2. In a multivibrator of the positive grid bias type: a pair of electronic tubes, each having anode, cathode and control grid electrodes; coupling condensers interconnecting the grid of each tube with the anode of the opposite tube; leak resistors connected from the grids of the respective tubes to a source of positive biasing potential; a source of plate voltage; plate resistors connected from the anodes of said tubes respectively to the positive terminal of said plate voltage source; connections from said cathodes respectively to the negative terminal of said plate voltage source; four networks; each network consisting of a separate and independent condenser and resistor connected in series; each one of said networks bridging one of said grid-leak resistors and one of said anode resistors.

3. In a multivibrator of the positive grid bias type: a pair of electronic tubes, each having anode, cathode and control grid electrodes; coupling condensers interconnecting the grid of each tube with the anode of the opposite tube; leak resistors connected from the grids of said tubes respectively to a source of positive biasing potential; a source of plate voltage; plate resistors connected from the anodes of said tubes respectively to the positive terminal of said plate voltage source; connections from the cathodes of said tubes respectively to the negative terminal of said plate voltage source; and shunt connections provided about said plate resistors respectively; each of said shunt connections comprising a resistor other than said grid-leak resistors in series with a condenser other than said coupling condensers 4. In a multivibrator, a pair of electronic tubes, said tubes having anode, cathode and control electrodes, a source of direct current voltage, a pair of anode resistors, a pair of anode circuits, each of said anode circuits comprising one of said anode electrodes, one of said anode resistors, and the positive terminal of said source of voltage, a pair of cathode circuits, each of said cathode circuits comprising one of said cathode electrodes and the negative terminal of said source of voltage, a pair of grid-leak resistors, a source of positive biasing potential, a pair of grid circuits, each of said grid circuits comprising one of said grid electrodes, one of said grid-leak resistors and said source of positive biasing potential, a pair of coupling condensers, each of said coupling condensers coupling the grid electrode of one of said tubes to the anode electrode of the other of said tubes, a pair of networks, each of said networks comprising a resistor and a condenser connected in series, each of said networks connected in shunt of one of said grid-leak resistors and each of said networks independent of said anode circuits.

5. In a multivibrator, a pair of electronic tubes, said tubes having anode, cathode and control grid electrodes, a source of direct current voltage, a pair of anode resistors, a pair of anode circuits, each of said anode circuits comprising one of said anode electrodes, one of said anode resistors, and the positive terminal of said source of voltage, a pair of cathode circuits, each of said cathode circuits comprising one of said cathode electrodes and the negative terminal of said source of voltage, a pair of grid-leak resistors, a source of biasing potential, a pair of grid circuits, each of said grid circuits comprising one of said grid electrodes, one of said leak resistors and said source of positive biasing potential, a pair of coupling condensers, each of said coupling condensers coupling the grid electrode of one of said tubes to the anode electrode of the other of said tubes, two pairs of networks, each of said networks comprising a resistor and a condenser connected in series, each one of the first pair of said networks connected in shunt of one of said grid-leak resistors and each one of said first pair of networks independent of said anode circuits, each one of the other pair of said networks connected in shunt of one of said anode resistors and each one of said other pair of networks independent of said grid circuits.

EDWARD DASKAM, Jr.

REFERENCES CITED

The following references are of record in the file of this patent:

UNITED STATES PATENTS

| Number | Name | Date |
|---|---|---|
| 2,338,395 | Bartelink | Jan. 4, 1944 |
| 2,365,512 | Bartelink | Dec. 19, 1944 |
| 2,540,478 | Frost | Feb. 6, 1951 |